United States Patent
Tang et al.

(10) Patent No.: US 8,549,645 B2
(45) Date of Patent: Oct. 1, 2013

(54) SYSTEM AND METHOD FOR DETECTION OF DENIAL OF SERVICE ATTACKS

(75) Inventors: Yuchun Tang, Johns Creek, GA (US);
Zhenyu Zhong, Alpharetta, GA (US);
Yuanchen He, Johns Creek, GA (US)

(73) Assignee: McAfee, Inc., Santa Clara, CA (US)

( * ) Notice: Subject to any disclaimer, the term of this patent is extended or adjusted under 35 U.S.C. 154(b) by 63 days.

(21) Appl. No.: 13/278,578

(22) Filed: Oct. 21, 2011

(65) Prior Publication Data
US 2013/0104230 A1   Apr. 25, 2013

(51) Int. Cl.
*H04L 29/06*   (2006.01)

(52) U.S. Cl.
USPC ............................... 726/23; 726/22

(58) Field of Classification Search
USPC ...................................... 726/22, 23
See application file for complete search history.

(56) References Cited

U.S. PATENT DOCUMENTS

| | | | |
|---|---|---|---|
| 8,402,543 B1* | 3/2013 | Ranjan et al. .................... 726/23 |
| 2003/0110396 A1* | 6/2003 | Lewis et al. ..................... 713/201 |
| 2005/0028010 A1* | 2/2005 | Wallman ........................ 713/201 |
| 2005/0044406 A1* | 2/2005 | Stute ............................ 713/201 |
| 2007/0283436 A1 | 12/2007 | Duffield et al. |
| 2008/0086435 A1* | 4/2008 | Chesla ............................ 706/12 |
| 2009/0254663 A1* | 10/2009 | Alperovitch et al. ......... 709/227 |
| 2010/0082513 A1 | 4/2010 | Liu |
| 2010/0275262 A1* | 10/2010 | Anand et al. ..................... 726/23 |
| 2011/0016523 A1 | 1/2011 | Oh et al. |
| 2011/0107412 A1 | 5/2011 | Lee et al. |
| 2011/0153811 A1* | 6/2011 | Jeong et al. ..................... 709/224 |
| 2012/0174224 A1* | 7/2012 | Thomas et al. ................. 726/24 |

FOREIGN PATENT DOCUMENTS

EP   2230797   9/2010

OTHER PUBLICATIONS

Onut, I-V., and Ali A. Ghorbani. "Toward a feature classification scheme for network intrusion detection." Communication Networks and Services Research Conference, 2006. CNSR 2006. Proceedings of the 4th Annual. IEEE, 2006.*
International Search Report and Written Opinion; PCT/US2012/060570; pp. 10, Mar. 28, 2013.

* cited by examiner

*Primary Examiner* — Kambiz Zand
*Assistant Examiner* — Michael Guirguis
(74) *Attorney, Agent, or Firm* — Baker Botts L.L.P.

(57) ABSTRACT

Systems and methods for detecting a denial of service attack are disclosed. These may include receiving a plurality of web log traces from one of a plurality of web servers; extracting a first set of features from the plurality of web log traces; applying a first machine learning technique to the first set of features; producing a first plurality of user classifications for communication to the web server; extracting a second set of features from the plurality of web log traces; applying a second machine learning technique to the second set of features; producing a second plurality of user classification for communication to the web server; communicating the first plurality of user classifications to the web server based at least on the plurality of web log traces; and communicating the second plurality of user classifications to the web server based at least on the plurality of web log traces.

40 Claims, 3 Drawing Sheets

SYSTEM AND METHOD FOR DETECTION OF DENIAL OF SERVICE ATTACKS

TECHNICAL FIELD

The present disclosure relates in general to information security, and more particularly to detecting denial of service attacks on computer systems.

BACKGROUND

As the ubiquity and importance of digitally stored data continues to rise, the importance of keeping that data secure rises accordingly. While companies and individuals seek to protect their data, other individuals, organizations, and corporations seek to exploit security holes in order to access that data and/or wreak havoc on the computer systems themselves. Generally the different types of software that seek to exploit security holes can be termed "malware," and may be categorized into groups including viruses, worms, adware, spyware, and others. One type attack that may be carried out by malware is known as a "denial of service" attack. A denial of service attack may occur when one or more electronic devices attempt to make another, networked electronic device unavailable. This type of attack may be carried out by flooding the target electronic device with illegitimate network traffic, such as illegitimate requests for information, so that the target device is overwhelmed and can not respond to legitimate network traffic.

As networks expand, and more and more electronic devices are able to communicate with one another, denial of service attacks may take advantage of the increased availability of networked electronic devices. One such adaptation of a denial of service attack is a "distributed denial of service" ("DDOS") attack. With a DDOS attack, a large number of electronic devices may work together to flood a target electronic device with illegitimate network traffic, as described above. DDOS attacks have increasingly become a threat to web services provided by internet service providers, large corporations, and governments around the world.

As these attacks continue to rise, it becomes increasingly important to be able to detect these attacks as quickly as possible, and to protect the vulnerable electronic devices as thoroughly as possible. In a DDOS, the large number of attacking electronic devices, and the correspondingly large amount of data, makes detection and protection correspondingly difficult.

SUMMARY

In accordance with the teachings of the present disclosure, the disadvantages and problems associated with detecting a denial of service attack on an electronic device may be improved, reduced, or eliminated.

In accordance with one embodiment of the present disclosure, a distributed denial of service ("DDOS") detection engine communicatively coupled to a plurality of web servers, the DDOS detection engine comprising a web server interface, a first DDOS analysis engine, and a second DDOS analysis engine. The web server interface may be configured to receive a plurality of web log traces from a web server, the web server being one of the plurality of web servers; communicate a first plurality of user classifications to the web server based at least on the plurality of web log traces; and communicate a second plurality of user classifications to the web server based at least on the plurality of web log traces. The first DDOS analysis engine may be configured to extract a first set of features from the plurality of web log traces; apply a first machine learning technique to the first set of features; and produce the first plurality of user classifications for communication to the web server. The second DDOS analysis engine may be configured to extract a second set of features from the plurality of web log traces; apply a second machine learning technique to the second set of features; and produce the second plurality of user classification for communication to the web server.

In accordance with another embodiment of the present disclosure, a method for detecting a distributed denial of service ("DDOS") attack on a networked system comprising a plurality of web servers is disclosed. The method includes receiving a plurality of web log traces from a web server, the web server being one of the plurality of web servers; extracting a first set of features from the plurality of web log traces; applying a first machine learning technique to the first set of features; producing a first plurality of user classifications for communication to the web server; extracting a second set of features from the plurality of web log traces; applying a second machine learning technique to the second set of features; producing a second plurality of user classification for communication to the web server; communicating the first plurality of user classifications to the web server based at least on the plurality of web log traces; and communicating the second plurality of user classifications to the web server based at least on the plurality of web log traces.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an electronic device may include any device, subdevice, or combination of devices and/or subdevices capable of storing, processing, sending, receiving, using, or handling data stored in digital form, including data stored on computer-readable media. Computer-readable media may include any device, subdevice, or combination of devices and/or subdevices configured to store digital data, including without limitation hard disk drives, flash memory, read only memory, random access memory, optical memory, solid state memory, or any other type of removable and/or fixed media used to store digital data.

Figure 1:
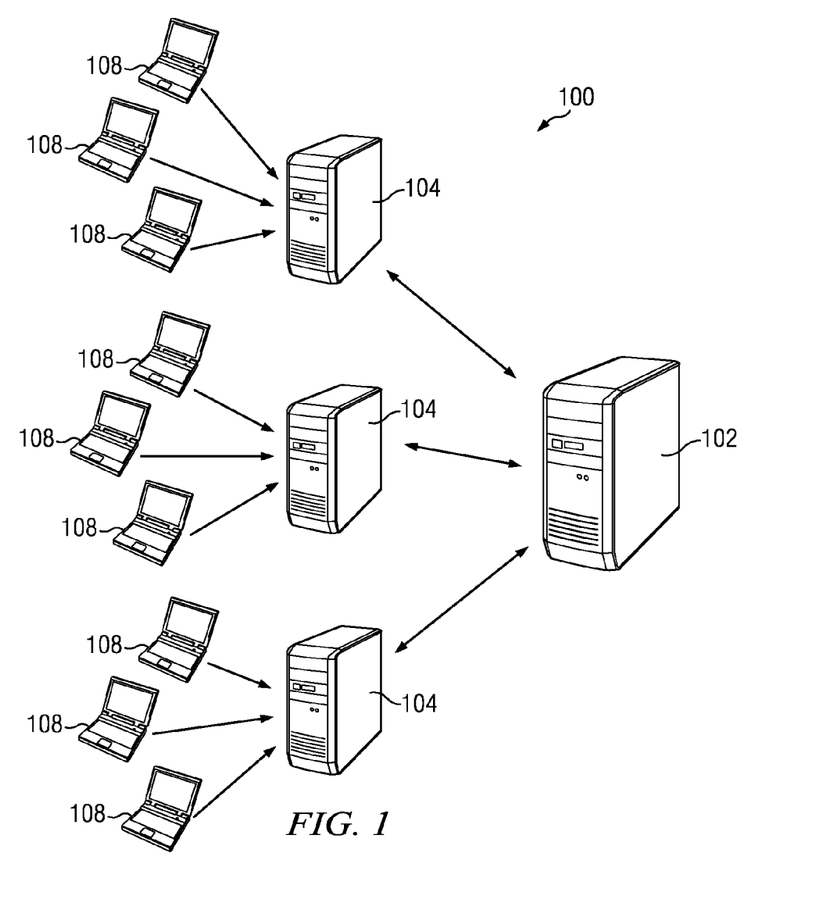
FIG. 1 illustrates a networked system including a distributed denial of service ("DDOS") engine communicatively coupled to one or more web server(s), which are each communicatively coupled to one or more requesting device(s), in accordance with certain embodiments of the present disclosure.

FIG. 1 illustrates a networked system 100 including a distributed denial of service ("DDOS") engine 102 communicatively coupled to one or more web server(s) 104, which are each communicatively coupled to one or more requesting device(s) 108, in accordance with certain embodiments of the present disclosure. In some embodiments, requesting device(s) 108 may be an electronic device configured to request data from one or more web server(s) 104. As an illustrative example, requesting device 108 may be a personal computer, laptop computer, tablet computer, cellular telephone, personal digital assistant, server, computer cluster, or any other electronic device configured to request data from one or more web server(s) 104. In some embodiments, requesting device 108 may be communicatively coupled to one or more web server(s) 104 via any appropriate network communication mechanism, including wireless internet, wired internet, and/or intranet mechanisms.

In some embodiments, web server 104 may be any server configured to receive data requests from one or more requesting device(s) 108 via an appropriate network communication mechanism, as described in more detail above. Web server 104 may include hardware and/or software stored on computer-readable media to be executed by hardware configured to deliver data from one or more data sources to data requesting devices 108 via a network communication mechanism. As an illustrative example, web server 104 may store data belonging to a company's web site and/or portions of certain enterprise software such as SAP.

Networked system 100, in some embodiments, includes one or more web servers 104. Although FIG. 1 illustrates three web servers 104, networked system 100 may include more or fewer web servers 104. In one embodiments, networked system 100 may include a large number of web servers 104. As an illustrative example, networked system 100 may be owned and/or operated by a provider of cloud computing services. In this configuration networked system 100 may provide web hosting services to a large number of customers, where some or all of the customers require multiple web servers 104. A customer may require multiple web servers 104 for a number of reasons, including data redundancy and/or high availability. In some configurations, networked system 100 may include hundreds of web servers running on many different physical machines. In such a configuration, web servers 104 may be running on clusters of servers, as virtual machines on multiple physical servers, or any other appropriate means of hosting large numbers of web servers 104.

Web servers 104 may also be communicatively coupled to other systems within networked system 100, including database servers, application servers, and/or email servers. In some embodiments, these other servers may provide the data requested by requesting devices 108. In other embodiments, other servers may provide some backend processing required to provide data to requesting devices 108.

Networked system 100 may also include DDOS detection engine 102. As described in more detail below with reference to FIGS. 2-5, DDOS detection engine 102 may include hardware and/or software stored on computer-readable media to be executed by hardware configured to analyze a large amount of data from web servers 104 in order to determine whether networked system 100 is under a DDOS attack from some set of requesting devices 108. In some embodiments, DDOS detection engine 102 may be configured to receive information representative of network traffic from one or more web servers 104 via any appropriate communication mechanisms. As an illustrative example, DDOS detection engine 102 may be communicatively coupled to web servers 104 via the wireless internet, wired internet, and/or intranet mechanisms, hardware bus, cable, or any other appropriate communication mechanism. In some embodiments, DDOS detection engine 102 may reside on the same physical machine as one or more web server(s) 104.

Although FIG. 1 illustrates three web servers 104 communicatively coupled to DDOS detection engine 102, networked system 100 may include one or more DDOS detection engine(s) 102, which may, in some embodiments, be communicatively coupled to one another. In one embodiment, networked system 100 may include multiple DDOS detection engines 102 configured to support a large number of web servers 104. As an illustrative example, networked system 100 may be owned and/or operated by a provider of cloud computing services. In this configuration networked system 100 may provide web hosting services to a large number of customers, where some or all of the customers require multiple web servers 104. A customer may require multiple web servers 104 for a number of reasons, including data redundancy and/or high availability. In some configurations, networked system 100 may include hundreds of web servers running on many different physical machines. In such a configuration, it may be necessary or desirable to configure multiple DDOS detection engines 102 to support the large required number of web servers 104. In such a configuration, DDOS detection engine(s) 102 may be resident on clusters of servers, as a virtual machine on multiple physical servers, or any other appropriate means of hosting DDOS detection engine(s) 102.

In operation, a number of requesting devices 108 may request data from one or more web servers 104 over a network. Web servers 104 may then communicate information representative of this network traffic to DDOS detection engine 102. DDOS detection engine 102 may then analyze this information to determine whether networked system 100 is undergoing a DDOS attack, as described in more detail below with reference to FIGS. 2-5. In one embodiment, a large numbers of requesting devices request data from a large number of web servers 104 over a network. As an illustrative example, tens of thousands of computers (requesting devices 108) may be in communication with thousands of web servers 104 in the ordinary course of accessing the internet. Some portion of those tens of thousands of computers (some portion of requesting devices 108) may then attempt to shut down one or more of web servers 104 by flooding one or more web servers 104 with a large amount of illegitimate network traffic in an attempt to prevent the remainder of the computers (the remainder of requesting devices 108) from accessing the one or more web servers 104 with legitimate network traffic. As described in more detail below with reference to FIGS. 2-5, DDOS detection engine 102 may then analyze the information representative of network traffic coming from the tens of thousands of computers (requesting devices 108) to determine the source, extent, and type of the DDOS attack.

As described in more detail below with reference to FIGS. 2-5, DDOS detection engine 102 may, in some embodiments, attempt in real time to determine whether a DDOS attack is underway. DDOS detection engine 102 may also analyze information representative of network traffic in more detail to determine whether a DDOS attack is underway.

Figure 2:
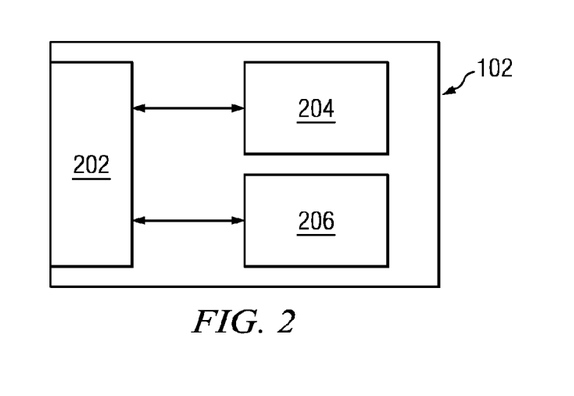
FIG. 2 illustrates a high level diagram of a DDOS detection engine, in accordance with certain embodiments of the present disclosure.

FIG. 2 illustrates a high level diagram of a DDOS detection engine 102, in accordance with certain embodiments of the present disclosure. In some embodiments, DDOS detection engine 102 may include one or more web server interface(s) 202, first DDOS analysis engine 204, and second DDOS analysis engine 206. In some embodiments, web server interface(s) 202, first DDOS analysis engine 204, and second DDOS analysis engine 206 may be hardware, firmware, and/or software stored on computer-readable media and executable by hardware and/or firmware. In some embodiments, web server interface(s) 202, first DDOS analysis engine 204, and second DDOS analysis engine 206 may be separate hardware and/or software modules. In other embodiments, web server interface(s) 202, first DDOS analysis engine 204, and second DDOS analysis engine 206 may be portions, functions, routines, subroutines, or other subset of a larger software program stored on computer-readable media and executable by hardware and/or firmware. In still other embodiments, web server interface(s) 202, first DDOS analysis engine 204, and second DDOS analysis engine 206 may be present on one or multiple electronic devices such as servers.

Although FIG. 2 illustrates one web server interface 202, DDOS detection engine 102 may include one or multiple web server interfaces 202. In some embodiments, DDOS detection engine 102 may interface with multiple web servers 104, as depicted above with reference to FIG. 1. Multiple web servers 104 may interface with DDOS detection engine 102 via one or more web server interface(s) 202. In some embodiments, web server interface 202 may be configured to receive information representative of network traffic between requesting devices 108 and web servers 104. As an illustrative example, the information representative of network traffic may include web log traces from the data requests from requesting devices 108 to web servers 104. These traces may include a plurality of data points indicative of the nature and quality of a particular data request from requesting devices 108 to web servers 104.

In some embodiments, it may be necessary or desirable to analyze the web log traces through multiple avenues in order to determine whether networked system 100 is undergoing a DDOS attack, giving consideration to approaches with varying degrees of certainty that may, for example, require differing data loads and/or differing processing resources (including time) to complete. In some embodiments, it may be necessary or desirable to perform a first-order analysis of certain information representative of network traffic in order to determine whether a DDOS attack is underway. This analysis may be able to roughly identify whether a given set of network traffic may be classified as malicious or benign with a first level of certainty. In some configurations, it may be necessary or desirable to perform this first-order analysis as quickly as possible in order to, for example, mitigate any potential damage resulting from a DDOS attack. In such a configuration, performing the analysis in real time or near real time may provide networked system 100 with information useful in determining whether a DDOS attack is underway. As described further below, this first-order analysis may not be sufficient, standing alone, to determine whether a DDOS attack is underway. However, when combined with other information (e.g., external indicators, analyses from other DDOS detections engines 102), sufficient information may be made available.

In the same or alternative embodiments, a more detailed analysis with a higher level of certainty may be necessary or desirable. Depending on the requirements of a given configuration, more data may be processed using the same or different analytic techniques to allow more detailed analysis. If additional time and other processing resources are available, the more detailed analysis may be able to consider more data and/or data over a longer period of time. In addition to providing a higher degree of certainty, a more detailed analysis may be necessary or desirable in analyzing historical data, trend data, forensic data, and/or other data mining techniques of interest in the future prevention and/or historical analysis of DDOS attacks.

Referring again to FIG. 2, DDOS detection engine 102 may include first DDOS analysis engine 204 and second DDOS analysis engine 206. In some embodiments, first DDOS analysis engine 204 may be responsible for performing a first-order analysis, attempting to classify network traffic as malicious or benign and determine whether a DDOS attack is underway in real time or near real time. In the same or alternative embodiments, second DDOS analysis engine 206 may be responsible for performing the more detailed analysis, attempting to classify network traffic as malicious or benign (and/or to classify the network traffic into one or more of a plurality of malicious traffic categories) and determine whether a DDOS attack is underway with a higher degree of certainty. In the illustrated embodiment, DDOS analysis engine 102 is depicted as having a single first DDOS detection engine 204 and a single second DDOS detection engine 206. In the same or alternative embodiments, a given DDOS analysis engine 102 may have more of either first or second DDOS detection engines 204, 206 without departing from the scope of the present disclosure. Additionally, first DDOS detection engine 204 and second DDOS detection engine 206 are depicted as separate modules for ease of description only. In some embodiments, first and second DDOS detection engines 204, 206 may be implemented as hardware, software, and/or firmware that is separate, integrated, and/or partially integrated. Further, first and second DDOS detection engines 204, 206 may be present on the same or different electronic devices. For example, in configurations in which second DDOS detection engine 206 is responsible for a more detailed DDOS analysis, it may be necessary or desirable for one second DDOS detection engine 206 to gather data from multiple first DDOS detection engines 204 of multiple networked systems 100.

In some embodiments, first DDOS detection engine 204 may perform a first-order analysis of information representative of network traffic in real time or near real time in order to classify the network traffic as either malicious or benign. TABLE 1 below lists a set of illustrative data points that may be used by DDOS detection engine 102. Although TABLE 1 lists a set of illustrative data points, more or fewer data points may be used by DDOS detection engine 102 without departing from the scope of the present disclosure.

TABLE 1

Source Internet Protocol
Type of data request (e.g., GET or POST)
Status code returned
Uniform Resource Indicator requested
Referrer
User Agent
Country of Origin
State of Origin
City of Origin
Time of request
Time taken by request
Data size of requested return As described above with reference to TABLE 1, web server interface 202 may be configured to receive information representative of network traffic between requesting devices 108 and web servers 104. Information representative of the network traffic for any given request may include some or all of the data listed in TABLE 1. By combining the information representative of the network traffic for a large number of data requests between requesting devices 108 and web servers 104 over a period of time, DDOS detection engine 102 may be able to determine whether a DDOS attack is underway against networked system 100, as described in more detail below and with reference to FIGS. 3-5.

Referring again to FIG. 2, DDOS detection engine 102 may include first DDOS analysis engine 204. In some embodiments, first DDOS analysis engine 204 may be configured to extract a set of features from the information representative of network traffic between requesting devices 108 and web servers 104. In some embodiments, first DDOS analysis engine 204 may be further configured to apply a machine learning technique to the extracted set of features, and then produce a plurality of user classifications of the data requests between requesting devices 108 and web servers 104 based on the application of the machine learning technique to the extracted set of features.

In some embodiments, first DDOS analysis engine 204 may be configured to extract a set of features from the information representative of network traffic between requesting devices 108 and web servers 104. A feature may be raw data representative of network traffic, compiled data representative of network traffic, calculated data, and/or some combination thereof. In some embodiments, a feature is data representative of a set of data requests between requesting devices 108 and web servers 104.

In some embodiments, DDOS analysis engine 204 may create a feature vector containing a number of features to be used in the data analysis. As an illustrative example, DDOS analysis engine 204 may create a feature vector including the following features: (A) number of requests from a Source Internet Protocol address ("SIP"); (B) number of distinct Uniform Resource Identifiers ("URIs") requested by SIP; (C) number of distinct referrers of requests by SIP ("USER-AGENT"); and (D) number of distinct user agents of requests by SIP ("REFERRER"). In such an example, the feature vector may be represented in shorthand by: <SIP, URI, REFERRER, USERAGENT>.

A SIP may be an Internet Protocol ("IP") address, Media Access Control ("MAC") address, or other identifier unique to a requester of data. In some embodiments, each requesting device 108 may have one or more SIPs. For example, requesting device 108, a laptop, may be assigned an IP address before communicating with web server 104. Web server 104 may then track all data requests from that IP address. This data may then be associated with this SIP. A URI may be a Uniform Resource Locator ("URL") such as a web site address, file transfer protocol ("FTP") address, intranet address, or other identifier unique to a particular source of data. In some embodiments, a data source may have one or more URIs. For example, requesting device 108, a laptop, may request access to the home web site of McAfee, Inc., http://www.mcafee.com. In this example, the URL http://www.mcafee.com may comprise the URI. In other configurations, child web sites from the home web site of McAfee, e.g., http://www.mcafee.com/us, may be assigned the same or different URI from the parent web site. The assignment of URIs to data resources may be dependent on configuration. A referrer may be the SIP or other identifier of the network service referring requesting device 108 to web server 104. For example, requesting device 108, a laptop, may get to the URI http://www.mcafee.com by use of a search engine (e.g., Google) and the term "McAfee." In this example, by following the link to the McAfee home web page from the search engine, the search engine may be recorded by web server 104 as the referrer. The referrer may be identified by name, IP address, MAC address, or any other appropriate identifier. A user agent may be an application installed on requesting device 108 configured to communicate with web server 104. For example, requesting device 108, a laptop, may request access to the McAfee home web page by invocation of a standard web browser such as Microsoft Internet Explorer. Web server 104 may then store the identification of this user agent as a name, code name, code number, or any other appropriate identifier.

Although the above description uses illustrative examples and specific forms of illustrative features, these examples are provided only to aid in understanding and do not act to limit the scope of the present disclosure. As described in more detail above with reference to FIG. 1, requesting device 108 may be any appropriate electronic device communicatively coupled to web server 104. Additionally, in some embodiments, more, fewer, or different features may be extracted from the data representative of network traffic between requesting devices 108 and web servers 104. In some embodiments, the values of those features may be the same or different as those described above.

After extracting features from the data representative of network traffic between requesting devices 108 and web servers 104, first DDOS analysis engine 204 may be further configured to apply a clustering algorithm to the feature vectors created from the extracted features. In some embodiments, the clustering algorithm may be any appropriate algorithm designed to measure the concentration and/or dispersal of a distribution of data requests from requesting device(s) 108 to web server(s) 104. As an illustrative example, the clustering algorithm may be an entropy analysis of the feature vector. The following equation may be used to calculate the entropy H of a feature vector X:

$$H(X) = -\sum_{i=1}^{N} \left(\frac{n_i}{S}\right) \log_2 \left(\frac{n_i}{S}\right)$$

In the above equation, a value is summed from i=1 to N, where N may represent the number of SIPs being analyzed. In some embodiments, "$n_i$" may be the number of requests sent by the ith SIP. In such embodiments, S may be the total number of requests sent by all SIPs for the time period under analysis. The factor $$\left(\frac{n_i}{S}\right)$$

may be used as a probability function relating the requests from a particular SIP to the larger sample space. In the same or alternative embodiments, $n_i$ may be the number of URIs requested by the ith SIP, while S may be the total number of URIs requested by all SIPs for the time period under analysis. The use of an entropy function such as the illustrative example above may then provide an approximation of the legitimacy of web access traffic. A relatively low entropy value (i.e., close to 0) may correspond to a few SIPs sending a large number of requests or a few SIPs attempting to access a few URIs a large number of times. This type of entropy value may indicate illegitimate web traffic, and the traffic may be categorized as benign. A relatively high entropy value (i.e., close to 1), on the other hand, may indicate legitimate web traffic, and the traffic may therefore be categorized as malicious.

The example clustering algorithm performed on the feature vector may be calculated quickly and, in some embodiments, real time. By analyzing the feature vector in the above manner, a service provider or web site owner may be able to receive current or near-current data regarding the possibility of a DDOS attack on networked system 100. Although an entropy algorithm is used in the machine learning technique of the above example, other appropriate clustering algorithms and/or other machine learning techniques may be used without departing from the present disclosure. For example, a Gini coefficient of appropriate data may also be used. An appropriate machine learning technique may be one that allows first DDOS analysis engine 204 to provide data regarding a possible DDOS attack on networked system 100 in real time or near real time with a relatively high degree of confidence.

The result of the clustering algorithm may be indicative of a DDOS attack on networked system 100. For example, by using the feature vector described in the example above, the clustering algorithm may indicate a large series of data requests coming from a highly concentrated number of SIPs. This may be indicative of a concentrated denial of service assault on web servers 104. In some configurations, however, a large series of data requests coming from a highly concentrated number of SIPs may not be, on its own, indicative of such an attack. For example, there may be perfectly legitimate reasons why a web site sees a sudden spike in network traffic from a few SIPs. In such examples, the categorization resulting from the machine learning technique used by first DDOS analysis engine 204 may be combined with other data to determine whether a DDOS attack on networked system 100 is in fact under way. For example, the categorization may be combined with the categorizations from other first DDOS analysis engines 204 running on other DDOS detection engines 102.

Referring again to FIG. 2, DDOS detection engine 102 may include second DDOS analysis engine 206. In some embodiments, second DDOS analysis engine 206 may be configured to perform a more detailed analysis of information representative of web traffic, as described in more detail above. In some embodiments, second DDOS analysis engine 206 may extract a set of features from the information representative of network traffic between requesting devices 108 and web servers 104. In some embodiments, second DDOS analysis engine 206 may be further configured to apply a machine learning technique to the extracted set of features, and then produce a plurality of user classifications of the data requests between requesting devices 108 and web servers 104 based on the application of the machine learning technique to the extracted set of features. Illustrative examples of the data that may be used by second DDOS analysis engine 206 to perform a more detailed analysis are described in more detail below and with reference to TABLES 2-5

In some embodiments, second DDOS analysis engine 206 may be configured to extract a set of features from the information representative of network traffic between requesting devices 108 and web servers 104. A feature may be raw data representative of network traffic, compiled data representative of network traffic, calculated data, and/or some combination thereof. In some embodiments, a feature is data representative of a set of data requests between requesting devices 108 and web servers 104.

TABLE 2 below lists a set of illustrative features that may be used by second DDOS analysis engine 206. The illustrative features in TABLE 2 may generally describe network traffic from requesting devices 108 to web servers 104. Although TABLE 2 lists a set of illustrative features, more or fewer features may be used by second DDOS analysis engine 206 without departing from the scope of the present disclosure.

TABLE 2

| | |
|---|---|
| The number of total requests SIP sends | The ratio of requests returns status code 4xx |
| The number of total GET requests SIP sends | The ratio of requests returns status code 3xx |
| The number of total POST requests SIP sends | The ratio of requests returns status code 2xx |
| The number of total requests other than GET-POST that SIP sends | The ratio of requests returns status code 1xx |
| The ratio of GET requests to the total requests that SIP sends | The ratio of requests returns status code 0xx |
| The ratio of POST requests to the total requests that SIP sends | The distinct number of URIs requested by SIP |
| The ratio of other requests to the total requests that SIP sends | The distinct number of referrers refers the requests sent by SIP |
| The number of requests that SIP sends returns status code 5xx | The distinct number of UserAgent SIP uses to send requests |
| The number of requests that SIP sends returns status code 4xx | The density of the requests based on the country that the SIP resides in |
| The number of requests that SIP sends returns status code 3xx | The overlap between referrers and URIs in the requests sent by SIP |
| The number of requests that SIP sends returns status code 2xx | The average delta time in seconds between two consecutive requests sentry SIP |
| The number of requests that SIP sends returns status code 1xx | The standard deviation of delta time |
| The number of requests that SIP sends returns status code 0xx | The average time taken for a request sent by SIP |
| The ratio of requests returns status code 5xx | The average size of results in bytes returned by web server to SIP |

In some embodiments, the general features of network traffic may be useful in identifying a DDOS attack. For example, if a SIP produces a large number of data requests, the SIP may be part of a DDOS attack. Similarly, if a SIP produces a large number of data-intensive requests (e.g., GET and/or POST requests), the SIP may be part of a DDOS attack. As another example, it may be useful to analyze the number of requests made by a SIP that return any one of the standardized Hypertext Transfer Protocol ("HTTP") status codes, including 1xx, 2xx, 3xx, 4xx, and/or 5xx. These status codes are defined by the HTTP standard. For ease of understanding "1xx" refers to the status codes beginning with 1-100, 101, 102, and 122; "2xx" refers to the status codes beginning with 2-200, 201, 202, 203, 204, 205, 206, 207, and 226; and so on. In the case of a DDOS attack where the attackers may be probing for a weak web site or web server 104, there may be a correspondingly high incidence of a particular status code.

As a further example, it may also be useful to examine the number of distinct URIs requested by an SIP. Human operators controlling legitimate web traffic may only be able to request a small number of distinct URIs over a short period of time. Automated, illegitimate web traffic, however, may be able to repeatedly request the same URI over a short period of time. Similarly, human operators controlling legitimate web traffic may only be able to use a small number of distinct referrers and/or user agents over a short period of time. Automated, illegitimate web traffic may not have similar restrictions.

As still further examples, it may be useful to statistically analyze the geographic region of origin for SIPs. In the case of DDOS attacks on government web sites, for instance, the attack may originate or be concentrated in a geographical area. Other statistical analyses of time periods between requests, size of data requests, and other features may also be useful in identifying a potential DDOS attack.

TABLE 3 below lists a set of illustrative features that may be used by second DDOS analysis engine 206. The illustrative features of TABLE 3 may be used instead of or in addition to the illustrative features of TABLE 2 above. The illustrative features in TABLE 3 may generally describe a network traffic session during a time period T from requesting devices 108 to web servers 104 during a predetermined time period. Although TABLE 3 lists a set of illustrative features, more, fewer, or different features may be used by second DDOS analysis engine 206 without departing from the scope of the present disclosure.

TABLE 3

| | |
|---|---|
| The number of sessions found during a predetermined time period T | The average number of requests per session |
| The standard deviation of requests per session | The average duration of a session |
| The standard deviation of duration of a session | The average requests per second |
| Discrete Fourier Transformation coefficients on the number of the requests per session | |

In some embodiments, the predetermined time period of traffic features may be useful in identifying a DDOS attack. For example, a typical data requesting pattern for a legitimate requesting device 108 may have an average time between data requests of T. In some configurations, it may be useful to identify a "session" as having the duration of T. If a second request is received from a SIP more than T seconds after a first request, then the second request may be deemed to be part of a new session. In contrast to legitimate network traffic, illegitimate traffic that may be part of a DDOS attack may artificially reduce the amount of time between requests. That is, a computer may be able to generate multiple data requests much faster than a human operator. In some configurations, analysis of the session features may be useful in detecting a DDOS attack.

TABLE 4 below lists a set of illustrative features that may be used by second DDOS analysis engine 206. The illustrative features of TABLE 4 may be used in instead of or in addition to the illustrative features of TABLES 2-3 above. The illustrative features in TABLE 4 may generally describe network traffic from requesting devices 108 to web servers 104 based on certain predetermined heuristics. Although TABLE 4 lists a set of illustrative features, more or fewer features may be used by second DDOS analysis engine 206 without departing from the scope of the present disclosure.

TABLE 4

| | |
|---|---|
| The ratio of top URI counts to the total URI count | The ratio of the top URI counts to distinct number of URIs |
| The entropy of all URIs requested by a SIP, where entropy is defined as: where Ci is a count of URIs sent by SIPi and Ti is the total count of URIs sent by all SIPs | |

In some embodiments, the heuristic features may be useful in identifying certain types of DDOS attacks. For example, entropy calculations may be useful in determining the concentration of a DDOS attack, as described in more detail above with reference to first DDOS analysis engine 204. Additionally, it may be useful to know which URIs are being requested the most. For example, in some DDOS attacks, the attacking electronic devices may target a child web page that typically receives less traffic than a parent web page. Such a child web page may be hosted on a web server that is configured to handle relatively less web traffic. By attacking the child web site directly, the DDOS attack may be able to affect other web servers and the parent web site.

TABLE 5 below lists a set of illustrative features that may be used by second DDOS analysis engine 206. The illustrative features of TABLE 5 may be used in instead of or in addition to the illustrative features of TABLES 2-4 above. The illustrative features in TABLE 5 may generally describe network traffic from requesting devices 108 to web servers 104 based on certain statistical analyses of other data. Although TABLE 5 lists a set of illustrative features, more or fewer features may be used by second DDOS analysis engine 206 without departing from the scope of the present disclosure.

TABLE 5

| | |
|---|---|
| Byte sequence probability (e.g., a Markov Model) of the URIs visited by SIPs. | Term frequency-inverse document frequency features extracted from URIs visited by SIPs |
| Regular expression rules | |

In some embodiments, second DDOS analysis engine 206 may use some or all of the features described in TABLES 2-5 to create a feature vector for use in determining whether a DDOS attack on networked system 100 is underway. Based on the features selected, the analysis undertaken by second DDOS analysis engine 206 may be computationally more intensive than the analysis undertaken by second DDOS analysis engine 206. As a result of the increased computation, the analysis undertaken by second DDOS analysis engine 206 may be more accurate. Additionally, the more intense calculations may require greater time and/or other processing requirements to complete than the first-order analysis performed in some embodiments by first DDOS analysis engine 204.

In some embodiments, second DDOS analysis engine 206 may analyze the chosen feature vector over a predetermined time window. This window may be set to different values depending on the chosen configuration and desired behavior it wishes to capture. For example, it may analyze information over days, hours, or minutes depending on a whether there may be a perceived threat, in which the analysis window may be shortened, or whether second DDOS analysis engine 204 may be in a normal monitoring window, in which case the analysis window may be lengthened. As an illustrative example, second DDOS analysis engine 206 may have a standard predetermined analysis time window of twelve hours. In some embodiments, second DDOS analysis engine 206 may receive a signal from first DDOS analysis engine 204 that network traffic has been provisionally categorized as malicious. Second DDOS analysis engine 206 may then recognize a potential DDOS attack on networked system 100 and shorten its analysis time window to five minutes. For the chosen time period, second DDOS analysis engine 206 may produce a feature vector from information representative of network traffic from requesting devices 108 to web servers 104.

In some embodiments, second DDOS analysis engine 206 may be further configured to apply the feature vector to one or more machine learning techniques in order to detect a DDOS attack on networked system 100. For example, second DDOS analysis engine 206 may apply a support vector machine ("SVM") technique to the feature vector in order to classify the network traffic as either malicious or benign. The SVM technique is a well-known machine learning technique used to predict into which of two possible classes an input value will fall. As an additional example, second DDOS analysis engine 206 may apply a random forest mechanism to the feature vector in order to classify the network traffic into one of a plurality of categories. In this configuration, it may be possible to predict not only whether traffic is malicious or benign, but also into which malware family the malicious traffic may fall. The random forest technique is a well-known machine learning used to predict into which of a plurality of categories an input value will fall. Depending on the chosen configuration of networked system 100, it may be necessary or desirable to use one or both of these machine learning techniques. For example, for some types of DDOS attacks, or in the case of a shortened analysis time window, it may be desirable to focus only on whether network traffic is malicious or benign. In other examples, such as when looking at historical data or when trying to predict the severity of an attack, it may be desirable to focus on the malware type originating the attack.

Additionally, although SVM and random forest techniques are used as illustrative examples, other machine learning techniques may be used without departing from the scope of the present disclosure. Other machine learning techniques, such as transductive confidence machines, may be used as well.

In some embodiments, once the machine learning technique has analyzed the feature vector, it may predict into which category the network traffic falls. Depending on the chosen technique, this may be two or more categories. Once the classification has been made, second DDOS analysis engine 206 may be further configured to communicate the classification information to web server interface 202. Web server interface 202 may, in some embodiments, be further configured to communicate the classification results of the machine learning technique from second DDOS analysis engine 206 to web servers 104. In the case of benign web traffic, web servers 104 may choose to take no additional action. In the case of malicious web traffic, web servers 104 may be further configured to take additional action. In some embodiments, this additional action may include blacklisting requesting devices 108 corresponding to the SIPs responsible for the malicious web traffic. Importantly, in some embodiments the classification of web traffic, perhaps initiating at only one web server 104, may be communicated to other web servers 104 to prevent them becoming targets of the DDOS attack as well.

Figures 3, 4:
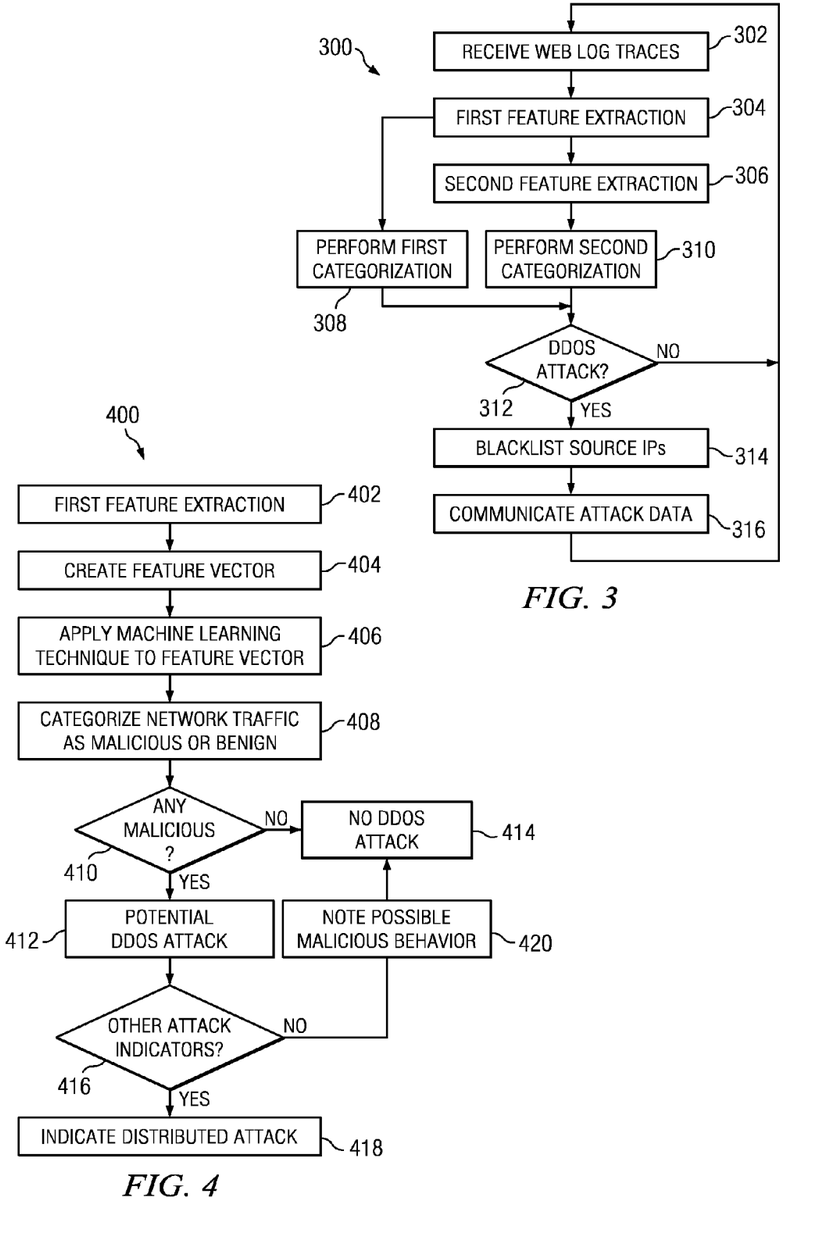
FIG. 3 illustrates a flow chart of an example method for detecting a DDOS attack on networked system, in accordance with certain embodiments of the present disclosure.
FIG. 4 illustrates a flow chart of an example method for detecting a DDOS attack on networked system in real time or near real time, in accordance with certain embodiments of the present disclosure.

FIG. 3 illustrates a flow chart of an example method 300 for detecting a DDOS attack on networked system 100, in accordance with certain embodiments of the present disclosure. Method 300 includes a first feature extraction, a second feature extraction, a first categorization, a second categorization, and a determination of a DDOS attack.

According to one embodiment, method 300 preferably begins at step 302. Teachings of the present disclosure may be implemented in a variety of configurations of electronic device 100. As such, the preferred initialization point for method 300 and the order of steps 302-316 comprising method 300 may depend on the implementation chosen.

At step 302 DDOS detection engine 102 receives information reflecting web traffic between requesting devices 108 and web servers 104 from web servers 104. After receiving this information, method 300 may proceed to step 304. At step 304, first DDOS analysis engine 204 of DDOS detection engine 102 may perform a first feature extraction, as described in more detail above with reference to FIG. 2 and below with reference to FIG. 4. After performing the first feature extraction, method 300 may proceed to steps 306 and 308.

Referring first to step 308, first DDOS analysis engine 204 of DDOS detection engine 102 may perform a first categorization, as described in more detail above with reference to FIG. 2 and below with reference to FIG. 4. In some embodiments, this categorization may be performed in real-time or near real-time on the selected feature vector produced in the first feature extraction in step 304. In some embodiments, this categorization may include classifying network traffic as either malicious or benign. After performing the first categorization, method 300 may proceed to step 312.

At step 312, method 300 may determine whether there is a DDOS attack underway against networked system 100. If such an attack is not underway, method 300 may return to step 302. If such an attack is underway, method 300 may proceed to step 314, where the SIPs responsible for the DDOS attack may be blacklisted at some or all web servers 104. After taking this action, method 300 may proceed to step 316, where data regarding the attack is communicated to other components of networked system 100. After communicating the attack data, method 300 may return to step 302.

Referring again to step 304, after performing the first feature extraction, method 300 may then also proceed to step 306. At step 306, second DDOS analysis engine 206 of DDOS detection engine 202 may perform a second feature extraction. As described in more detail above with reference to FIG. 2 and below with reference to FIG. 5, this feature extraction may produce a feature vector containing a larger number of features and/or more complex features than the first feature extraction performed at step 304. After performing the second feature extraction, method 300 may proceed to step 310, where second DDOS analysis engine 206 of DDOS detection engine 202 may perform a second categorization, as described in more detail above with reference to FIG. 3 and below with reference to FIG. 5. In some embodiments, this categorization may include identifying network traffic as either malicious or benign. In other embodiments, this categorization may include classifying malicious network traffic into one of a plurality of malware families. After performing the second categorization, method 300 may proceed to step 312.

At step 312, method 300 may determine whether there is a DDOS attack underway against networked system 100. If such an attack is not underway, method 300 may return to step 302. If such an attack is underway, method 300 may proceed to step 314, where the SIPs responsible for the DDOS attack may be blacklisted at some or all web servers 104. After taking this action, method 300 may proceed to step 316, where data regarding the attack is communicated to other components of networked system 100. After communicating the attack data, method 300 may return to step 300.

Although FIG. 3 discloses a particular number of steps to be taken with respect to method 300, method 300 may be executed with more or fewer steps than those depicted in FIG. 3. For example, FIG. 3 illustrates, at steps 304-10, method 300 performing the first and second feature extractions 304, 306 sequentially. In some embodiments, these steps may be performed simultaneously. As an additional example, as described in more detail above with reference to FIG. 2, after determining that there may be a DDOS attack as a result of the first categorization at steps 308, 312, method 300 may then proceed to step 306 for the second feature extraction. In the same or alternative embodiments, method 300 may perform the determination of a DDOS attack at step 312 multiple instances at different times. As a results, steps 314, 316 may also be performed in multiple instances at different times.

Additionally, steps of method 300 may include a number of sub-steps, as described in more detail below with reference to FIGS. 4-5. Further, in some embodiments, some action may be taken as a result of the identification of a DDOS attack other than blacklisting source IPs as describe in step 314. In still other embodiments, steps 314 and 316 may be combined into a single step or step 316 may not be performed at all.

FIG. 4 illustrates a flow chart of an example method 400 for detecting a DDOS attack on networked system 100 in real time or near real time, in accordance with certain embodiments of the present disclosure. Method 400 includes a first feature extraction, creation of a feature vector, applying a machine learning technique to the feature vector, and classifying network traffic as malicious or benign.

According to one embodiment, method 400 preferably begins at step 402. Teachings of the present disclosure may be implemented in a variety of configurations of electronic device 100. As such, the preferred initialization point for method 400 and the order of steps 402-420 comprising method 400 may depend on the implementation chosen. Generally the steps of method 400 illustrated in FIG. 4 may correspond to steps 304, 308, and 312 of method 300 illustrated in FIG. 3. In some embodiments, step 402 may correspond generally to step 302, and steps 404-408 may correspond generally to step 308. In some embodiments, steps 410-420 of method 400 may correspond generally to step 312 of method 300. In other embodiments, steps 410-420 of method 400 may be performed prior to execution of step 312 of method 300.

At step 402 first DDOS analysis engine 204 of DDOS detection engine 102 may extract a set of features from information reflecting web traffic between requesting devices 108 and web servers 104 from web servers 104, as described in more detail above with reference to FIGS. 1-3. In some embodiments, first DDOS analysis engine 204 may be configured to select features for extraction such that the extracted features may be analyzed in real-time or near real-time. In other embodiments, another component of networked system 100 may inform first DDOS analysis engine 204 of the appropriate features to extract. After performing the first extraction, method 400 may proceed to step 404.

At step 404, first DDOS analysis engine 204 may create a feature vector from the features extracted at step 402, as described in more detail above with reference to FIGS. 1-3. The feature vector may include information representative of network traffic between requesting devices 108 and web servers 104. As an illustrative example, as described above with reference to FIG. 2, the feature vector may be <SIP, URI, REFERRER, USERAGENT>. After creating the feature vector, method 400 may proceed to step 406.

At step 406, first DDOS analysis engine 204 of DDOS detection engine 202 may apply an appropriate machine learning technique to the feature vector, as described in more detail above with reference to FIGS. 1-3. In some embodiments, the machine learning technique may be a clustering algorithm used to predict whether network traffic is malicious or benign, as described in more detail above with reference to FIG. 2. As an illustrative example, method 400 may apply an entropy analysis to the feature vector. After applying the machine learning technique to the feature vector, method 400 may proceed to step 408.

At step 408, first DDOS analysis engine 204 of DDOS detection engine 102 may classify network traffic as malicious or benign, as described in more detail above with reference to FIGS. 1-3. In some embodiments, first DDOS analysis engine 204 may categorize network traffic as only malicious or benign. After categorizing the network traffic, method 400 may proceed to step 410, where method 400 may determine whether any malicious network traffic exists. If no malicious network traffic exists, method 400 may proceed to step 414, where method 400 may indicate that no DDOS attack is likely. If malicious network traffic does exist, method 400 may proceed to step 412.

At step 412, method 400 may identify a potential DDOS attack based on the prior identification of malicious network traffic, as described in more detail above with reference to FIGS. 1-3. After identifying a potential DDOS attack, method 400 may proceed to step 416, where method 400 may determine whether other attack indicators exist. In some embodiments, other indicators of a DDOS attack may exist, as described in more detail above with reference to FIGS. 1-3. As an illustrative example, other DDOS detection engines 102 may also have recognized some malicious network traffic. In some configurations, while the alert of a single DDOS detection engine 102 may not be sufficient to identify a DDOS attack with any confidence, the alert of multiple DDOS detection engines 102 may be sufficient. In other embodiments, an external warning of an imminent threat, or other potential attack indicators may be used to check the results of first DDOS analysis engine 204. If no other attack indicators are found, method 400 may proceed to step 420.

At step 420, method 400 may note the potential malicious behavior. In some embodiments, method 400 may then communicate this potential malicious behavior to other components of networked system 100 such as web servers 104. After nothing the possible malicious behavior, method 400 may proceed to step 414, where method 400 may indicate that no DDOS attack is likely. If, at step 416, other attack indicators are found, method 400 may proceed to step 418. At step 418, method 400 may indicate that a DDOS attack is underway against networked system 100.

Although FIG. 4 discloses a particular number of steps to be taken with respect to method 400, method 400 may be executed with more or fewer steps than those depicted in FIG. 4. For example, FIG. 4 illustrates, at steps 416-20, method 400 checking the classification of network traffic as malicious against other attack indicators. In some embodiments, these steps may be eliminated. For example, the machine learning technique applied by first DDOS analysis engine 204 may be sufficiently accurate so as not to need the additional check. Additionally, method 400 may include additional steps. For example, once a potential DDOS attack is identified, it may be necessary or desirable to perform many actions to protect networked system 100 against an imminent attack. Further, although the steps of method 400 illustrated in FIG. 4 generally correspond to steps 304, 308, and 312 of method 300 illustrated in FIG. 3, this may vary depending on the selected configuration. For example, a given configuration may perform steps 410-420 of method 400 prior to performing step 312 of method 300. In another configuration, some or all of steps 410-420 of method 400 may be performed as step 312 of method 300.

Figure 5:
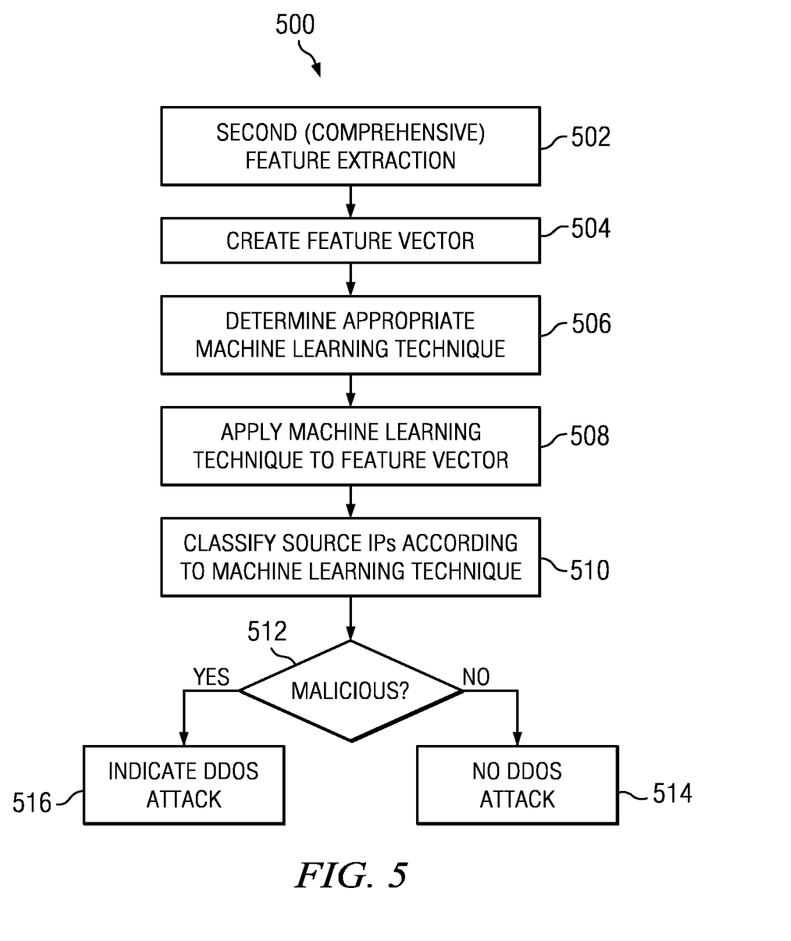
FIG. 5 illustrates a flow chart of an example method for detecting a DDOS attack on networked system over a more extended period of time, in accordance with certain embodiments of the present disclosure.

FIG. 5 illustrates a flow chart of an example method 500 for detecting a DDOS attack on networked system 100 over a more extended period of time, in accordance with certain embodiments of the present disclosure. Method 500 includes a second feature extraction, creation of a feature vector, applying a machine learning technique to the feature vector, and classifying network traffic as malicious or benign.

According to one embodiment, method 500 preferably begins at step 502. Teachings of the present disclosure may be implemented in a variety of configurations of electronic device 100. As such, the preferred initialization point for method 500 and the order of steps 502-516 comprising method 500 may depend on the implementation chosen. Generally the steps of method 500 illustrated in FIG. 5 may correspond to steps 306-12 of method 300 illustrated in FIG. 3. In some embodiments, step 502 may correspond generally to step 302, and steps 504-510 may correspond generally to step 308. In some embodiments, steps 512-16 of method 500 may correspond generally to step 312 of method 300. In other embodiments, steps 512-16 of method 500 may be performed prior to execution of step 312 of method 300.

At step 502 second DDOS analysis engine 206 of DDOS detection engine 202 may extract a set of features from information reflecting web traffic between requesting devices 108 and web servers 105 from web servers 105, as described in more detail above with reference to FIGS. 1-3. In some embodiments, second DDOS analysis engine 206 may be configured to select a complex and/or computation-intensive set of features for extraction such that analysis of the extracted features may be as accurate as desired. In other embodiments, another component of networked system 100 may inform second DDOS analysis engine 206 of the appropriate features to extract. After performing the first extraction, method 500 may proceed to step 504.

At step 504, second DDOS analysis engine 206 may create a feature vector from the features extracted at step 502, as described in more detail above with reference to FIGS. 1-3. The feature vector may include information representative of network traffic between requesting devices 108 and web servers 105. As an illustrative example, as described above with reference to FIG. 2, the feature vector may include general characteristics, session characteristics, and heuristics of the data representative of network traffic. After creating the feature vector, method 500 may proceed to step 506.

At step 506, method 500 may determine an appropriate machine learning technique for use with the extracted feature vector. As described in more detail above with reference to FIGS. 1-3, an umber of machine learning techniques may be used depending on the desired configuration and/or the data under analysis. In some configurations, a SVM analysis may be appropriate. In other configurations, a random forest analysis may be appropriate. After determining the appropriate machine learning technique, method 500 may proceed to step 508.

At step 508, second DDOS analysis engine 206 of DDOS detection engine 102 may apply the appropriate machine learning technique to the feature vector, as described in more detail above with reference to FIGS. 1-3. After applying the machine learning technique to the feature vector, method 500 may proceed to step 510. At step 510, second DDOS analysis engine 206 of DDOS detection engine 102 may classify network traffic as malicious or benign, as described in more detail above with reference to FIGS. 1-3. In some embodiments, second DDOS analysis engine 206 may classify network traffic as only malicious or benign. In other embodiments, second DDOS analysis engine 206 may classify network traffic into a number of categories and/or subcategories. After classifying network traffic, method 500 may proceed to step 512, where method 500 may determine whether any malicious network traffic exists. If no malicious network traffic exists, method 500 may proceed to step 514, where method 500 may indicate that no DDOS attack is likely. If malicious network traffic does exist, method 500 may proceed to step 516, where method 500 may indicate that a DDOS attack is underway against networked system 100.

Although FIG. 5 discloses a particular number of steps to be taken with respect to method 500, method 500 may be executed with more or fewer steps than those depicted in FIG. 5. For example, method 500 may also include receiving a set of learning data for second DDOS analysis engine 206. This set of learning data, or updates to the set of learning data may improve the ability of second DDOS analysis engine 206 to classify network traffic as malicious or benign based on an appropriate machine learning technique. Additionally, although the steps of method 500 illustrated in FIG. 5 generally correspond to steps 305, 308, and 312 of method 300 illustrated in FIG. 3, this may vary depending on the selected configuration. For example, a given configuration may perform steps 512-16 of method 500 prior to performing step 312 of method 300. In another configuration, some or all of steps 512-16 of method 500 may be performed as part of step 312 of method 300.

What is claimed is:

1. A distributed denial of service ("DDOS") detection engine communicatively coupled to a plurality of web servers, the DDOS detection engine comprising:
   a web server interface configured to:
      receive a plurality of web log traces from a web server, the web server being one of the plurality of web servers;
      communicate a first plurality of user classifications to the web server based at least on the plurality of web log traces; and
      communicate a second plurality of user classifications to the web server based at least on the plurality of web log traces; and
   a first DDOS analysis engine configured to:
      extract a first feature vector from the plurality of web log traces, wherein the first feature vector is representative of network traffic on the plurality of web servers over a first period of time;
      apply a first machine learning technique to the first feature vector; and
      produce the first plurality of user classifications for communication to the web server in substantially real time; and a second DDOS analysis engine configured to:
extract a second feature vector from the plurality of web log traces, wherein the second feature vector is representative of network traffic on the plurality of web servers over a second period of time, the second period of time greater than the first period of time;
apply a second machine learning technique to the second feature vector; and
produce the second plurality of user classification for communication to the web server.

2. The DDOS detection engine of claim 1, wherein the DDOS detection engine further comprises a DDOS alert module, the DDOS alert module configured to alert the plurality of web servers of a DDOS attack on the web server.

3. The DDOS detection engine of claim 1, wherein the first machine learning technique comprises an entropy analysis of the plurality of web log traces.

4. The DDOS detection engine of claim 1, wherein the second machine learning technique comprises a random forest analysis of the plurality of web log traces.

5. The DDOS detection engine of claim 1, wherein the second machine learning technique comprises a support vector machine analysis of the plurality of web log traces.

6. The DDOS detection engine of claim 1, wherein the web server interface is further configured to communicate the first plurality of user classifications to the plurality of web servers in substantially real time.

7. The DDOS detection engine of claim 1, wherein the first feature vector comprises a source internet protocol identifier.

8. The DDOS detection engine of claim 1, wherein the first feature vector comprises a uniform resource indicator.

9. The DDOS detection engine of claim 1, wherein the first feature vector comprises a referrer indicator.

10. The DDOS detection engine of claim 1, wherein the first feature vector comprises a user agent indicator.

11. The DDOS detection engine of claim 1, wherein the first feature vector comprises a source internet protocol identifier.

12. The DDOS detection engine of claim 11, wherein the first feature vector further comprises a total number of GET requests sent by the source internet protocol identifier.

13. The DDOS detection engine of claim 11, wherein the first feature vector further comprises a total number of POST requests sent by the source internet protocol identifier.

14. The DDOS detection engine of claim 11, wherein the first feature vector further comprises a total number of requests sent by the source internet protocol identifier that are neither GET nor POST requests.

15. The DDOS detection engine of claim 11, wherein the first feature vector further comprises a list of requests sent by the source internet protocol identifier that return a standardized status code.

16. The DDOS detection engine of claim 15, wherein the first feature vector further comprises a plurality of ratios comparing a total of a single standardized status code returned from requests sent by the source internet protocol identifier to the list of requests sent by the source internet protocol identifier that return the standardized status code.

17. The DDOS detection engine of claim 11, wherein the first feature vector further comprises a statistical measure of time taken for a request sent by the source internet protocol identifier.

18. The DDOS detection engine of claim 11, wherein the first feature vector further comprises a statistical measure of size of a request sent by the source internet protocol identifier.

19. The DDOS detection engine of claim 11, wherein the first feature vector further comprises a statistical measure of session activity for a request sent by the source internet protocol identifier.

20. The DDOS detection engine of claim 11, wherein the first feature vector further comprises a statistical measure of a probability of the source internet protocol identifier requesting a requested uniform resource.

21. A method for detecting a distributed denial of service ("DDOS") attack on a networked system comprising a plurality of web servers, the method comprising:
receiving a plurality of web log traces from a web server, the web server being one of the plurality of web servers;
extracting a first feature vector from the plurality of web log traces, wherein the first feature vector is representative of network traffic on the plurality of web servers over a first period of time;
applying a first machine learning technique to the first feature vector;
producing a first plurality of user classifications for communication to the web server in substantially real time;
extracting a second feature vector from the plurality of web log traces, wherein the second feature vector res is representative of network traffic on the plurality of web servers over a second period of time, the second period of time greater than the first period of time;
applying a second machine learning technique to the second feature vector;
producing a second plurality of user classification for communication to the web server;
communicating the first plurality of user classifications to the web server based at least on the plurality of web log traces; and
communicating the second plurality of user classifications to the web server based at least on the plurality of web log traces.

22. The method of claim 21, further comprising alerting the plurality of web servers of a DDOS attack on the web server.

23. The method of claim 21, wherein the first machine learning technique comprises an entropy analysis of the plurality of web log traces.

24. The method of claim 21, wherein the second machine learning technique comprises a random forest analysis of the plurality of web log traces.

25. The method of claim 21, wherein the second machine learning technique comprises a support vector machine analysis of the plurality of web log traces.

26. The method of claim 21, wherein communicating the first plurality of user classifications to the plurality of web servers occurs in substantially real time.

27. The method of claim 21, wherein the first feature vector comprises a source internet protocol identifier.

28. The method of claim 21, wherein the first feature vector comprises a uniform resource indicator.

29. The method of claim 21, wherein the first feature vector comprises a referrer indicator.

30. The method of claim 21, wherein the first feature vector comprises a user agent indicator.

31. The method of claim 21, wherein the first feature vector comprises a source internet protocol identifier.

32. The method of claim 31, wherein the first feature vector further comprises a total number of GET requests sent by the source internet protocol identifier.

33. The method of claim 31, wherein the first feature vector further comprises a total number of POST requests sent by the source internet protocol identifier.

34. The method of claim 31, wherein the first feature vector further comprises a total number of requests sent by the source internet protocol identifier that are neither GET nor POST requests.

35. The method of claim 31, wherein the first feature vector further comprises a list of requests sent by the source internet protocol identifier that return a standardized status code.

36. The method of claim 35, wherein the first feature vector further comprises a plurality of ratios comparing a total of a single standardized status code returned from requests sent by the source internet protocol identifier to the list of requests sent by the source internet protocol identifier that return the standardized status code.

37. The method of claim 31, wherein the first feature vector further comprises a statistical measure of time taken for a request sent by the source internet protocol identifier.

38. The method of claim 31, wherein the first feature vector further comprises a statistical measure of size of a request sent by the source internet protocol identifier.

39. The method of claim 31, wherein the first feature vector further comprises a statistical measure of session activity for a request sent by the source internet protocol identifier.

40. The method of claim 31, wherein the first feature vector further comprises a statistical measure of a probability of the source internet protocol identifier requesting a requested uniform resource.

* * * * *